(12) United States Patent
Huang et al.

(10) Patent No.: US 11,221,550 B2
(45) Date of Patent: Jan. 11, 2022

(54) PROJECTION DEVICE

(71) Applicants: BENQ CORPORATION, Taipei (TW); BenQ Intelligent Technology (Shanghai) Co., Ltd, Shanghai (CN)

(72) Inventors: Chen-Cheng Huang, Taoyuan (TW); Tung-Chia Chou, New Taipei (TW)

(73) Assignees: BENQ CORPORATION, Taipei (TW); BenQ Intelligent Technology (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 17/155,149

(22) Filed: Jan. 22, 2021

(65) Prior Publication Data
US 2021/0232032 A1  Jul. 29, 2021

(30) Foreign Application Priority Data
Jan. 23, 2020 (CN) .......................... 202010076606.9

(51) Int. Cl.
*G03B 21/14* (2006.01)
*G03B 21/20* (2006.01)
*H04N 9/31* (2006.01)

(52) U.S. Cl.
CPC ....... *G03B 21/2033* (2013.01); *G03B 21/204* (2013.01); *G03B 21/2053* (2013.01); *H04N 9/3161* (2013.01)

(58) Field of Classification Search
CPC ...... G03B 21/00; G03B 21/14; G03B 21/204; G03B 21/2033; G03B 21/2053; H04N 9/31; H04N 9/3161
See application file for complete search history.

(56) References Cited

U.S. PATENT DOCUMENTS

| | | | |
|---|---|---|---|
| 9,781,394 B2 * | 10/2017 | Hartwig | H04N 9/3161 |
| 11,061,313 B2 * | 7/2021 | Hsieh | G03B 21/2033 |
| 2014/0192328 A1 * | 7/2014 | Lin | F21V 13/14 353/7 |
| 2018/0343425 A1 * | 11/2018 | Liao | H04N 9/3155 |
| 2019/0354001 A1 * | 11/2019 | Tsai | G03B 21/208 |
| 2020/0348585 A1 * | 11/2020 | Hsieh | G03B 21/2033 |
| 2020/0351480 A1 * | 11/2020 | Pan | G02B 13/002 |
| 2021/0218943 A1 * | 7/2021 | Huang | H04N 9/3152 |

* cited by examiner

*Primary Examiner* — William C. Dowling

(57) ABSTRACT

A projection device includes a laser light source and a wavelength conversion assembly. The laser light source is configured to emit a first laser light having a first wavelength. The wavelength conversion assembly is configured to convert a first portion of the first laser light into a second laser light, wherein the second laser light has a second wavelength different from the first wavelength. The second laser light is reflected back to an upstream optical path of the wavelength conversion assembly through the wavelength conversion assembly, and a second portion of the first laser light is reflected to a downstream optical path of the wavelength conversion assembly through the wavelength conversion assembly.

20 Claims, 4 Drawing Sheets

PROJECTION DEVICE

This application claims the benefit of People's Republic of China application Serial No. 202010076606.9, filed Jan. 23, 2020, the subject matter of which is incorporated herein by reference.

BACKGROUND OF THE INVENTION

Field of the Invention

The present disclosure relates to a projection device, and more particularly to projection device including a polarization direction conversion layer.

Description of the Related Art

The light color of the laser light originally emitted by the laser light source of the conventional laser projection device may deviate from the expected color coordinate point on the chromaticity coordinate, or the laser light may also occur color shift of color difference after being refracted/reflected by multiple optical elements and such issues that affect the display color display does not meet expectations. Therefore, how to propose a new projection device to make the light color of the image light projected by the projection device match or approach the expected color coordinate point on the chromaticity coordinate, for the industry in the art, is one of the goals.

SUMMARY OF THE INVENTION

The embodiment of the present invention is to provide a projection device capable of making the light color of the image light projected by the projection device match or approach the expected color coordinate point on the chromaticity coordinate.

According to an embodiment of the present invention, a projection device is provided. The projection device includes a laser light source and a wavelength conversion assembly. The laser light source is configured to emit a first laser light having a first wavelength. The wavelength conversion assembly is configured to convert a first portion of the first laser light into a second laser light, wherein the second laser light has a second wavelength different from the first wavelength. The second laser light is reflected back to an upstream optical path of the wavelength conversion assembly through the wavelength conversion assembly, and a second portion of the first laser light is reflected to a downstream optical path of the wavelength conversion assembly through the wavelength conversion assembly.

According to an embodiment of the present invention, a projection device is provided. The projection device includes a laser light source, a phosphor wheel and a wavelength conversion assembly. The laser light source is configured to emit a first laser light, wherein the first laser light has a first wavelength. The phosphor wheel has a light transmission area through which allows the first laser light to travel. The wavelength conversion assembly is configured to convert the first laser light traveling through the light transmission area into a second laser light, wherein the second laser has a second wavelength different from the first wavelength. The second laser light is reflected back to an upstream optical path of the wavelength conversion assembly through the wavelength conversion assembly.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 2 shows a schematic diagram of the phosphor wheel of FIG. 1 rotating to a position where the wavelength conversion area is aligned with the optical path;

Figure 1:
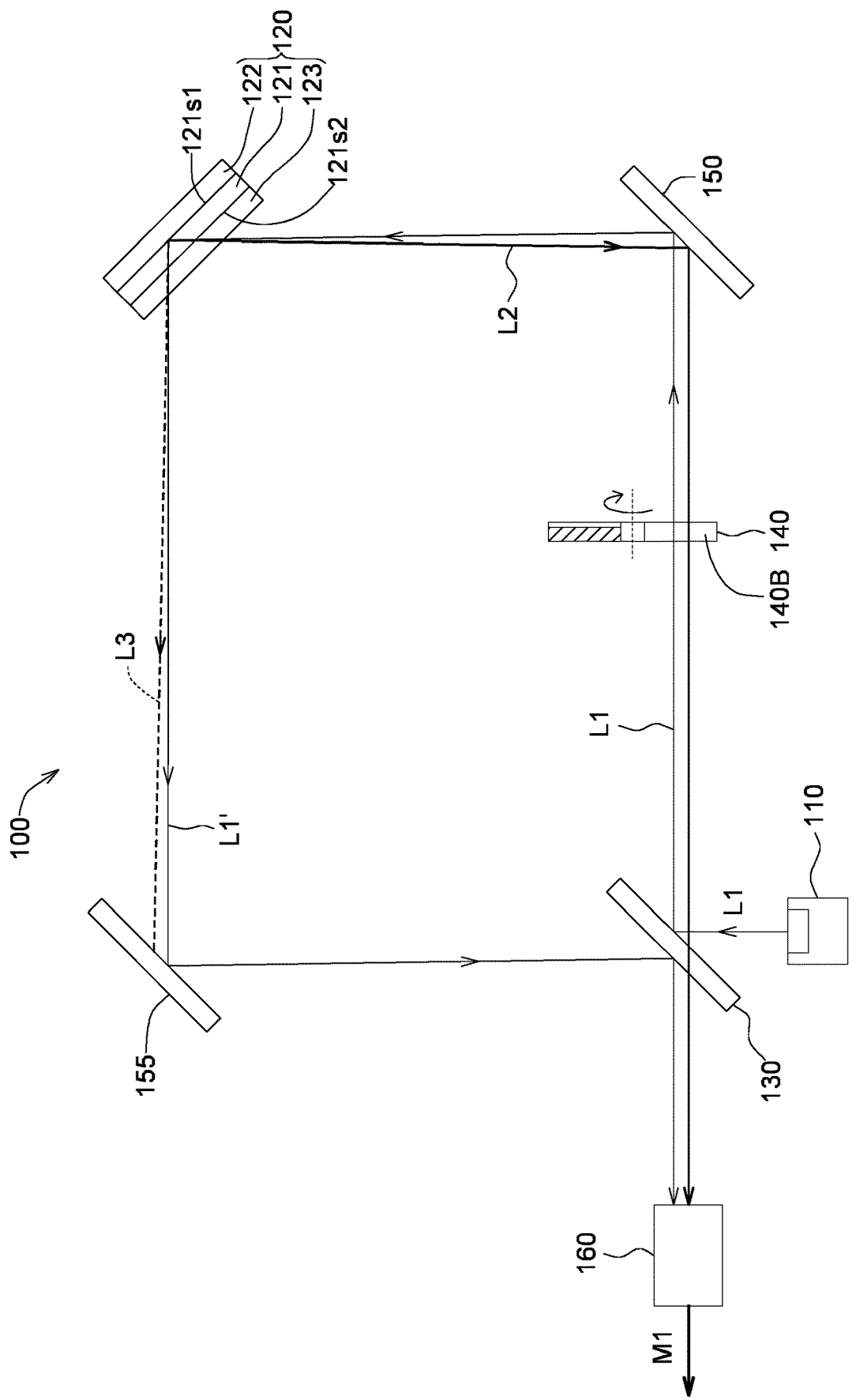
FIGS. 1 and 2 show schematic diagrams of a projection device according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
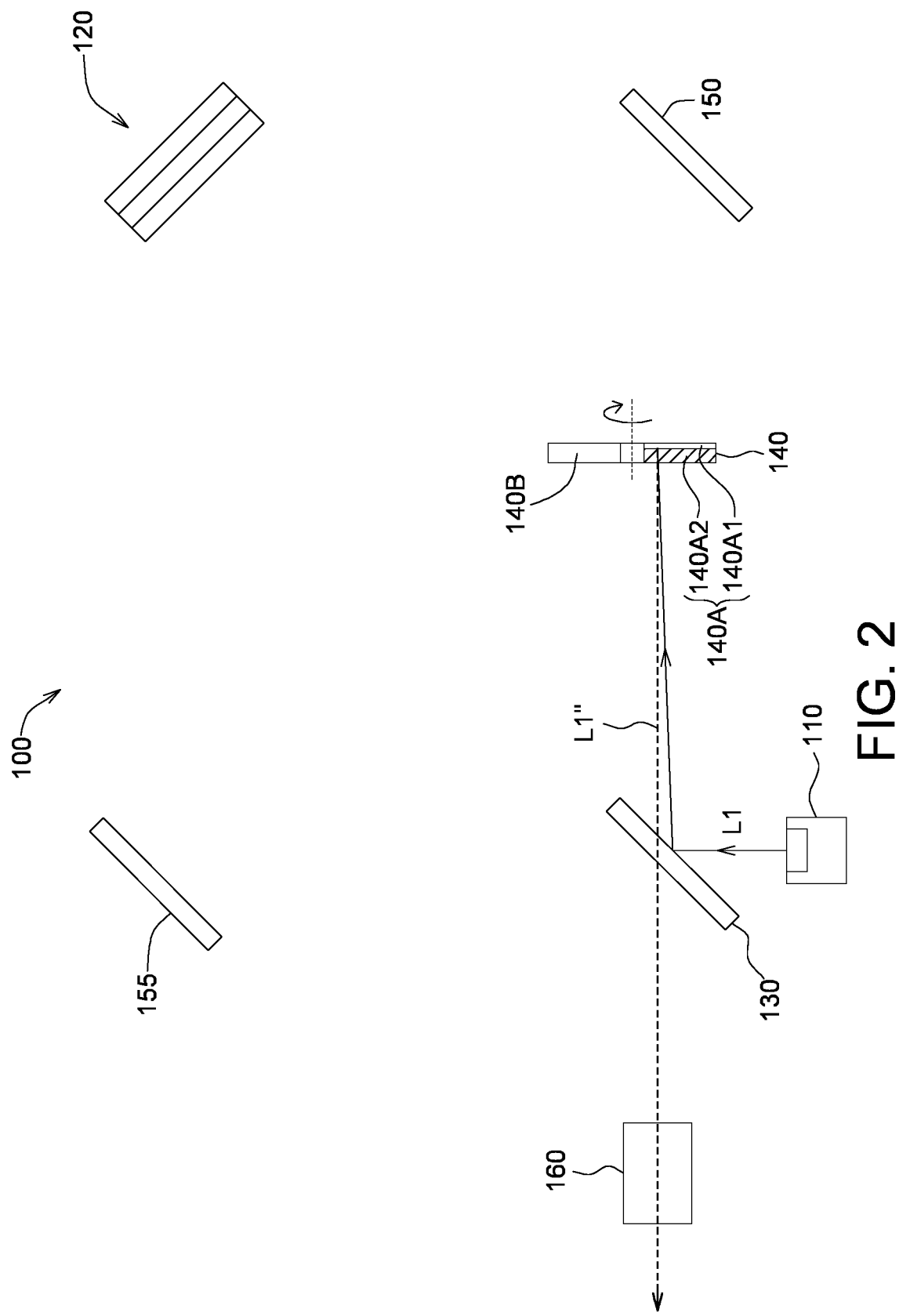
Figure 3:
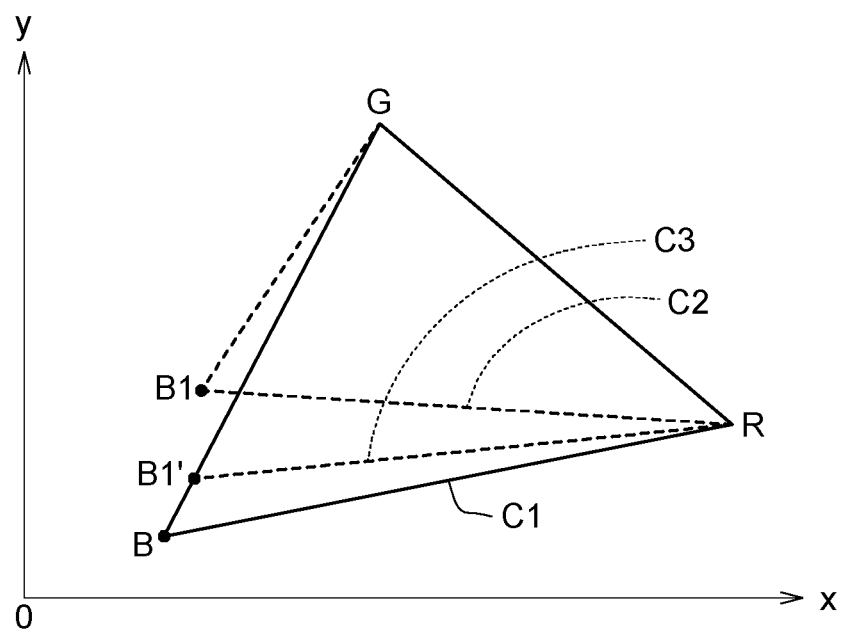
FIG. 3 shows a schematic diagram of a chromaticity coordinate of an image light of the projection device of FIG. 1.

Referring to FIGS. 1 to 3. FIGS. 1 and 2 show schematic diagrams of a projection device 100 according to an embodiment of the present invention, wherein FIG. 1 shows a schematic diagram of the phosphor wheel 140 of the projection device 100 rotating to a position where the light transmission area 140B is aligned with an optical path, and FIG. 2 shows a schematic diagram of the phosphor wheel 140 of FIG. 1 rotating to a position where the wavelength conversion area 140A is aligned with the optical path, and FIG. 3 shows a schematic diagram of a chromaticity coordinate of an image light of the projection device 100 of FIG. 1.

The projection device 100 includes a laser light source 110, a wavelength conversion assembly 120, a dichroic mirror 130, a phosphor wheel 140, at least one reflector 150, a beam splitter 155 and a projection lens 160.

As shown in FIG. 1, the laser light source 110 is configured to emit a first laser light L1 having a first wavelength. The wavelength conversion assembly 120 is configured to convert a first portion of the first laser light L1 into the second laser light L2. The second laser light L2 has a second wavelength different from the first wavelength. The second laser light L2 is reflected back to an upstream optical path of the wavelength conversion assembly 120 through the wavelength conversion assembly 120, and a second portion L1' of the first laser light L1 is reflected to a downstream optical path of the wavelength conversion assembly 120 through the wavelength conversion assembly 120. As described above, the first laser light L1 is partially converted into the second laser light L2. Since the wavelength of the second laser light L2 is different from the wavelength of the second portion L1' of the first laser light L1, the image light M1 could meet the expected light color after the second laser light L2 is mixed with the second portion L1' to be the image light M1.

As shown in FIG. 1, the wavelength-converted second laser light L2 is incident to the projection lens 160 along the upstream optical path of the wavelength conversion assembly 120, and the second portion L1' of the first laser light L1 is incident to the projection lens 160 along the downstream optical path of the wavelength conversion assembly 120. The second laser light L2 is mixed with the second portion L1' of the first laser light L1 to be the image light M1 within a light guide pillar (not shown) in front of the projection lens 160, and then the image light M1 is projected to the imaging screen (not shown) from the projection lens 160. Compared with omitting the image light (without the second laser light L2) projected by the wavelength conversion assembly 120, the second laser light L2 of the embodiment of the present invention could make the light color of the image light M1 match an expected color coordinate point in the chromaticity coordinate. In other words, the light color characteristics of the image light M1 could be changed/adjusted by the wavelength conversion assembly 120.

As shown in FIG. 3, the characteristic C1 represents the chromaticity triangle characteristic of the image light projected by the projection device without the wavelength conversion assembly 120, and the characteristic C2 represents the chromaticity triangle characteristic of the image light M1 projected by the projection device 100 of the embodiment of the present invention, wherein the label R represents red light, label G represents green light, label B represents blue light, and label B1 represents blue light that meets or is close to the color standard (specification) Rec. 709. In an embodiment, the first laser light L1 is, for example, blue light, and the wavelength conversion assembly 120 could convert the blue light into bluish green light, for example. For example, first wavelength of the first laser light L1 is, for example, blue light having wavelength between about 400 nanometers and about 500 nanometers, and light of the converted second wavelength is, for example, bluish green light between about 450 nanometers and about 550 nanometers, but the embodiment of the present invention is not limited thereto. Compared with the characteristic C1, the blue light B1 of the image light M1 (characteristic C2) projected by the projection device 100 is more consistent with or closer to the blue light regulated by the color standard Rec. 709.

As shown in FIG. 1, after the first laser light L1 is incident to the wavelength conversion assembly 120, its first portion is converted into a second laser light L2 and a third laser light L3, wherein second laser light L2 travels along the upstream optical path of the wavelength conversion assembly 120, and the third laser light L3 travels along the downstream optical path of the wavelength conversion assembly 120. In addition, after the first laser light L1 is incident to the wavelength conversion assembly 120, the second portion L1' of the first laser light L1, without being converted, travels along the downstream optical path of the wavelength conversion assembly 120.

In an embodiment, a ratio of the sum of the light intensity of the second laser light L2 and the light intensity of the third laser light L3 to the light intensity of the first laser light L1 ranges between about 8% to about 12%. In other words, after the first laser light L1 is excited by the wavelength conversion assembly 120, about 8% to 12% of the light quantity (i.e., the first portion of the first laser light L1) is converted into different wavelengths (i.e., the second laser light L2 and the third laser light L3), while the remaining light quantity (i.e., the second portion L1' of the first laser light L1) still maintains the original wavelength (primary or original light color). Such ratio of the wavelength conversion is sufficient to make the image light M1 projected by the projection device 100 more be consistent with or closer to the blue light B1 regulated by the color standard Rec.709.

The third laser light L3 has a third wavelength. The third laser light L3 is reflected to the beam splitter 155 through the wavelength conversion assembly 120. The beam splitter 155 is disposed on the downstream optical path of the wavelength conversion assembly 120 and configured to absorb the third laser light L3. As a result, the third laser light L3 could be prevented from being incident to the laser light source 110. In an embodiment, the wavelengths of the second laser light L2 and the third laser light L3 are the same, that is, the second wavelength of the second laser light L2 is the same as the third wavelength of the third laser light L3. Taking the third laser light L3 as green light for example, the laser light source 110 may be damaged if the green light is incident to the laser light source 110. However, since the beam splitter 155 could absorb the third laser light L3, it could prevent the third laser light L3 from damaging the laser light source 110.

As shown in FIGS. 1 and 2, the beam splitter 155 absorbs the third laser light L3, but could allow the first laser light L1 to be reflected, so as to reflect the first laser light L1 to the dichroic mirror 130. As shown in the figure, the dichroic mirror 130 is disposed on the downstream optical path of the laser light source 110 and configured to reflect the first laser light L1 (including its second portion L1') and allow the second laser light L2 to travel through.

As shown in FIGS. 1 and 2, the phosphor wheel 140 includes a wavelength conversion area 140A and a light transmission area 140B. The light transmission area 140B of the phosphor wheel 140 allows the first laser light L1 and the second laser light L2 to travel through. The wavelength conversion area 140A includes a reflection layer 140A1 and a wavelength conversion layer 140A2, wherein the wavelength conversion layer 140A2 is formed on the reflection layer 140A1. The wavelength conversion layer 140A2 includes, for example, a plurality of fluorescent particles, which could convert the wavelength of the first laser light L1 into other wavelength to change the light color of the first laser light L1. For example, the wavelength conversion layer 140A2 could convert blue light into yellow light, but the embodiment of the present invention is not limited thereto.

The phosphor wheel 140 could continuously rotate to a position where the wavelength conversion area 140A is aligned with the optical path of the first laser light L1, or rotates to a position where the transparent area 140B is aligned with the optical path of the first laser light L1.

As shown in FIG. 1, when the phosphor wheel 140 rotates to a position where the light transmission area 140B is aligned with the optical path of the first laser light L1, the laser optical path of the first laser light L1 from the laser light source 110 to the projection lens 160 sequentially travels through: the dichroic mirror 130, the light transmission area 140B of the phosphor wheel 140, the reflector 150, the wavelength conversion assembly 120, the beam splitter 155, the dichroic mirror 130 and the projection lens 160, wherein after the first laser light L1 is reflected by the wavelength conversion assembly 120, the second portion L1' is retained to continue to travel along the downstream optical path. The first portion of the first laser light L1, after its the wavelength is converted by the wavelength conversion assembly 120 to become the second laser light L2, the laser optical path of the second laser light L2 from the laser light source 110 to the projection lens 160 sequentially travels through: the dichroic mirror 130, the light transmission area 140B of the phosphor wheel 140, the reflector 150, the wavelength conversion assembly 120, the reflector 150, the light transmission area 140B of the phosphor wheel 140 and the dichroic mirror 130. The second portion L1' of the first laser light L1 and the second laser light L2 are mixed into the image light M1 after traveling through the dichroic mirror 130, and then projected to the imaging screen (not shown) through the projection lens 160.

As shown in FIG. 2, when the phosphor wheel 140 rotates to a position where the wavelength conversion area 140A is aligned with the optical path of the first laser light L1, the first laser light L1 travels through the wavelength conversion layer 140A2 to change as the wavelength of the first laser light L1 (which becomes the fourth laser light L1"). Then, the first laser light L1' is reflected by the reflection layer 140A1 to the dichroic mirror 130, and is projected to the imaging screen (not shown) through the dichroic mirror 130 and the projection lens 160 in sequence. As shown in the figure, the dichroic mirror 130 could further allow the fourth laser light L1' to travel through.

The detail structure of the wavelength conversion assembly 120 will be described below.

As shown in FIG. 1, the wavelength conversion assembly 120 includes a light transmission substrate 121, a phosphor layer 122 and a filter layer 123. The light transmission substrate 121 has a first surface 121s1 and a second surface 121s2 opposite to the first surface 121s1. The phosphor layer 122 is disposed on the first surface 121s1 of the light transmission substrate 121. The filter layer 123 is disposed on the second surface 121s2. As shown in the figure, the phosphor layer 122 could change the wavelength of the laser light, and the filter layer 123 could filter the wavelength of the laser light reflected by the filter layer 123, so that the wavelength of the laser light traveling through the filter layer 123 could be converted into a second wavelength (the second laser light L2) and the third wavelength (the third laser light L3). Furthermore, the first laser light L1 sequentially travels through the filter layer 123, the light transmission substrate 121 (which does not change the wavelength) and the phosphor layer 122, and changes the wavelength at the phosphor layer 122, then reflects from the phosphor layer 122 back to the light transmission substrate 121, and finally the filter layer 123 filters out the specific wavelength of the laser light. For example, the filter layer 123 allows the second laser light L2 with the second wavelength to travel through and allows the third laser light L3 with the third wavelength to travel through, while blocking and/or absorbing the laser light with the other wavelength range (wavelength range other than the second wavelength and the third wavelength).

As shown in FIG. 1, the light transmission substrate 121 could be used as a carrier of the phosphor layer 122 and the filter layer 123, and thus it could facilitate the arrangement of the phosphor layer 122 and the filter layer 123 in the optical path. However, in another embodiment, if not necessary, the wavelength conversion assembly 120 could omit the light transmission substrate 121. In such embodiment, the phosphor layer 122 and the filter layer 123 are disposed to each other or directly in contact.

Figure 4:
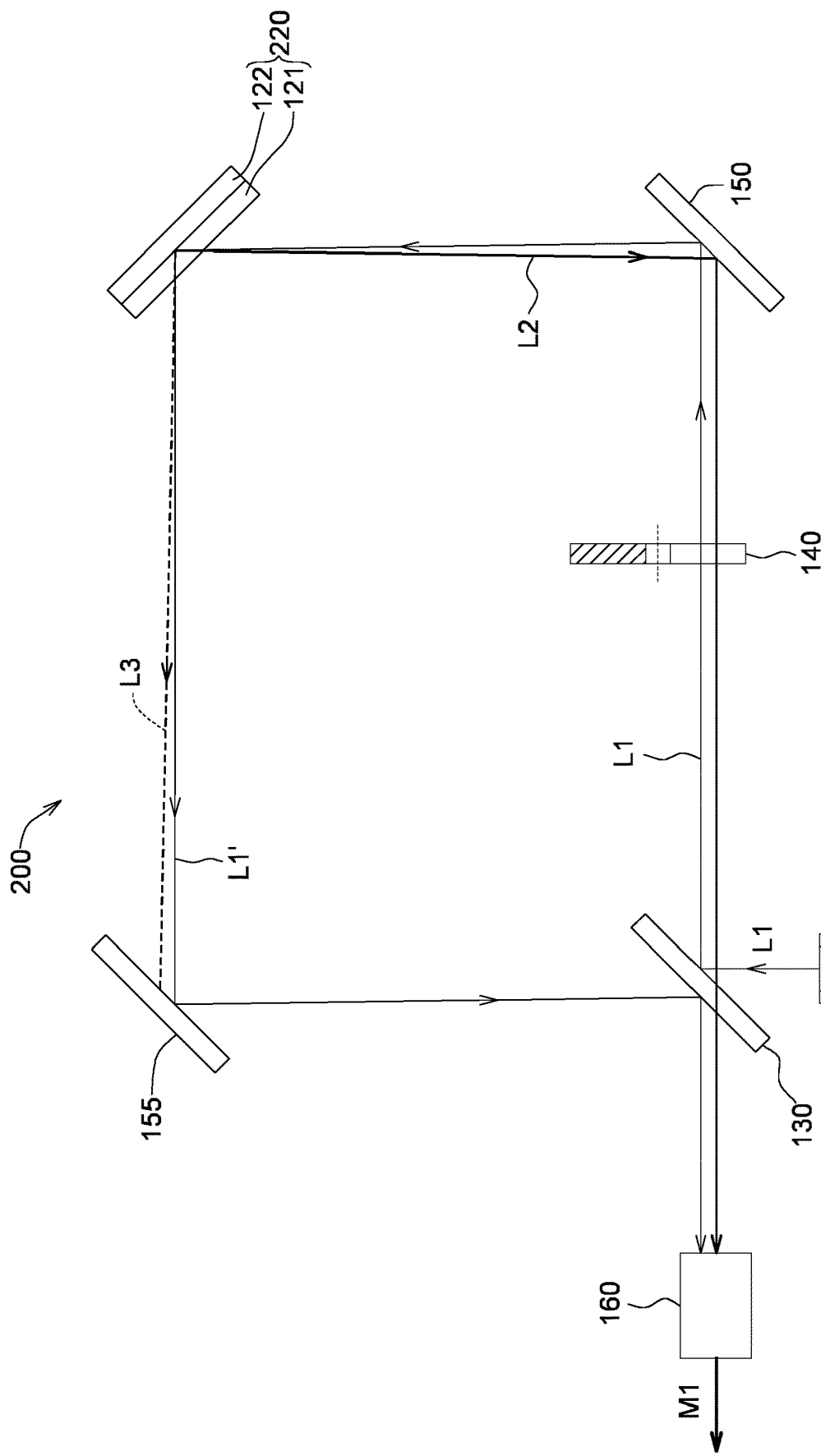
FIG. 4 shows a schematic diagram of a projection apparatus according to another embodiment of the present invention.

Referring to FIG. 4, FIG. 4 shows a schematic diagram of a projection apparatus 200 according to another embodiment of the present invention. The projection device 200 includes the laser light source 110, a wavelength conversion assembly 220, the dichroic mirror 130, the phosphor wheel 140, at least one reflector 150, the beam splitter 155 and the projection lens 160. The projection device 200 includes technical features similar to the projection device 100, except that the structure of the wavelength conversion assembly 220 of the projection device 200 is different from the structure of the wavelength conversion assembly 120 of the projection device 100.

Compared with the wavelength conversion assembly 120, the wavelength conversion assembly 220 of the present embodiment could omit the filter layer 123. Although the filter layer 123 is omitted, the first wavelength of the first laser light L1 could still be changed to the second wavelength (the second laser light L2) by the phosphor layer 122 of the wavelength conversion assembly 220, so that the image light M1 projected by the projection device conforms to or is close to the expected color on the chromaticity coordinates. In another embodiment, if not necessary, the wavelength conversion assembly 220 of the projection device 200 could also omit the light transmission substrate 121. As a result, the wavelength conversion assembly 220 is the phosphor layer 122 itself, and thus similarly the image light M1 projected by the projection device conforms to or is close to the expected color on the chromaticity coordinates.

As shown in FIG. 3, the characteristic C3 represents the chromaticity triangle characteristic of the image light M1 projected by the projection device 200. Compared with the characteristics C1, C2 and C3, it could be understood that the blue-light chromaticity characteristics (characteristic C3) the image light M1 projected by the projection device 200 ranged between the blue-light chromaticity characteristics (characteristic C2) of the image light M1 projected by the projection device 100 and the blue-light chromaticity characteristics of the image light projected by the projection device that omit the wavelength conversion assembly 220. Compared with the characteristic C1, the blue light B1' of the image light M1 (characteristic C3) projected by the projection device 200 is closer to the blue light regulated by the color standard Rec. 709 than the blue light B (which not travel through the wavelength conversion assembly 220).

The above-mentioned embodiment is described by taking the wavelength conversion assembly disposed on optical path between the reflector 150 and the beam splitter 155 as an example, but the embodiment of the present invention is not limited thereto. As long as the wavelength conversion disposed on the upstream optical path of the beam splitter 155, the embodiment of the present invention does not limit the position of the wavelength conversion assembly in the optical path. Due to the wavelength conversion assembly being disposed on the upstream optical path of the beam splitter 155, the third laser light L3 would be absorbed by the beam splitter 155 as it travels downward the downstream optical path, and thus it could prevent the third laser light L3 from damaging any optical assembly in the downstream optical path.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projection device, comprises:
a laser light source configured to emit a first laser light, wherein the first laser light has a first wavelength; and
a wavelength conversion assembly configured to convert a first portion of the first laser light into a second laser light, wherein the second laser light has a second wavelength different from the first wavelength;
wherein the second laser light is reflected back to an upstream optical path of the wavelength conversion assembly through the wavelength conversion assembly, and a second portion of the first laser light is reflected to a downstream optical path of the wavelength conversion assembly through the wavelength conversion assembly.

2. A projection device, comprises:
 a laser light source configured to emit a first laser light, wherein the first laser light has a first wavelength;
 a phosphor wheel having a light transmission area through which allows the first laser light to travel; and
 a wavelength conversion assembly configured to convert the first laser light traveling through the light transmission area into a second laser light, wherein the second laser has a second wavelength different from the first wavelength;
 wherein the second laser light is reflected back to an upstream optical path of the wavelength conversion assembly through the wavelength conversion assembly.

3. The projection device according to claim 2, wherein the wavelength conversion assembly is configured to convert the first portion of the first laser light traveling through from the light transmission area into the second laser light;
 wherein the second portion of the first laser light is reflected to a downstream optical path of the wavelength conversion assembly through the wavelength conversion assembly.

4. The projection device of claim 1, wherein the wavelength conversion assembly is further configured to convert the first portion of the first laser light into a third laser light, and the third laser light has a third wavelength;
 wherein the third laser light is reflected to the downstream optical path of the wavelength conversion assembly through the wavelength conversion assembly.

5. The projection device of claim 2, wherein the wavelength conversion assembly is further configured to convert the first portion of the first laser light into a third laser light, and the third laser light has a third wavelength;
 wherein the third laser light is reflected to a downstream optical path of the wavelength conversion assembly through the wavelength conversion assembly.

6. The projection device of claim 4, wherein the second wavelength is the same as the third wavelength.

7. The projection device of claim 5, wherein the second wavelength is the same as the third wavelength.

8. The projection device according to claim 4, wherein the projection device further comprises:
 a beam splitter disposed on the downstream optical path configured to absorb the third laser light.

9. The projection device according to claim 5, further comprises:
 a beam splitter disposed on the downstream optical path configured to absorb the third laser light.

10. The projection device of claim 8, further comprises:
 a dichroic mirror located in a downstream optical path of the beam splitter and configured to reflect the second portion of the first laser light but allow the second laser light to travel through;
 wherein the beam splitter is configured to reflect the second portion of the first laser light to the dichroic mirror.

11. The projection device of claim 1, wherein the wavelength conversion assembly comprises:
 a light transmission substrate has a first surface and a second surface opposite to the first surface;
 a phosphor layer disposed on the first surface; and
 a filter layer disposed on the second surface.

12. The projection device of claim 2, wherein the wavelength conversion assembly comprises:
 a light transmission substrate having a first surface and a second surface opposite to each other;
 a phosphor layer disposed on the first surface; and
 a filter layer disposed on the second surface.

13. The projection device of claim 11, wherein the phosphor layer is located in a downstream optical path of the filter layer.

14. The projection device of claim 12, wherein the phosphor layer is located in a downstream optical path of the filter layer.

15. The projection device of claim 1, wherein the wavelength conversion assembly is a phosphor layer.

16. The projection device of claim 2, wherein the wavelength conversion assembly is a phosphor layer.

17. The projection device of claim 1, wherein the second wavelength ranges between 450 nm and 550 nm.

18. The projection device of claim 2, wherein the second wavelength ranges between 450 nm and 550 nm.

19. The projection device according to claim 4, wherein a ratio of the sum of light intensity of the second laser light and light intensity of the third laser light to light intensity of the first laser light ranges between 8% to 12%.

20. The projection device of claim 5, wherein a ratio of the sum of light intensity of the second laser light and light intensity of the third laser light to light intensity of the first laser light ranges between 8% to 12%.

* * * * *